(12) United States Patent
Endo et al.

(10) Patent No.: US 9,114,668 B2
(45) Date of Patent: Aug. 25, 2015

(54) PNEUMATIC TIRE

(75) Inventors: Toyoaki Endo, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 75 days.

(21) Appl. No.: 13/639,388

(22) PCT Filed: Jun. 16, 2011

(86) PCT No.: PCT/JP2011/064320
§ 371 (c)(1),
(2), (4) Date: Oct. 4, 2012

(87) PCT Pub. No.: WO2012/060131
PCT Pub. Date: May 10, 2012

(65) Prior Publication Data
US 2013/0025763 A1 Jan. 31, 2013

(30) Foreign Application Priority Data
Nov. 2, 2010 (JP) ................................. 2010-246362

(51) Int. Cl.
*B60C 5/14* (2006.01)
*B60C 9/00* (2006.01)
*B60C 1/00* (2006.01)

(52) U.S. Cl.
CPC ................. *B60C 1/0008* (2013.04); *B60C 5/14* (2013.01); *B60C 2005/145* (2013.04); *Y10T 152/10855* (2015.01)

(58) Field of Classification Search
CPC ................. B60C 5/12; B60C 5/14; B60C 9/00
See application file for complete search history.

(56) References Cited

U.S. PATENT DOCUMENTS

| | | | | |
|---|---|---|---|---|
| 5,292,590 | A | * | 3/1994 | Lin et al. ........................ 428/494 |
| 5,738,158 | A | * | 4/1998 | Ozawa et al. ................... 152/510 |
| 5,851,323 | A | * | 12/1998 | Kaido et al. .................... 152/510 |
| 6,009,923 | A | * | 1/2000 | Hergenrother et al. ........ 152/510 |
| 2008/0314491 | A1 | | 12/2008 | Soeda et al. |
| 2008/0314492 | A1 | | 12/2008 | Tsou et al. |
| 2009/0151841 | A1 | | 6/2009 | Jones et al. |
| 2010/0147431 | A1 | | 6/2010 | Morooka |

FOREIGN PATENT DOCUMENTS

| | | |
|---|---|---|
| JP | H08-258505 A | 10/1996 |
| JP | 2008-12945 * | 1/2008 |

(Continued)

OTHER PUBLICATIONS

Machine translation of JP 2008-12945, 2008.*

(Continued)

*Primary Examiner* — Justin Fischer
(74) *Attorney, Agent, or Firm* — Novak Druce Connolly Bove + Quigg LLP

(57) ABSTRACT

Disclosed is a pneumatic tire comprising (A) reinforcing layer comprising a plurality of reinforcing cords or wires coated with a rubber composition, wherein (B) a film layer, (C) an elastomer layer, and (D) a film layer comprising ethylene-vinyl alcohol copolymer are sequentially laminated on the tire inner surface side of reinforcing layer (A), and the product of Young's modulus Eb (MPa) and thickness Gb (mm) of film layer (B) is equal to or more than 5 kN/m, wherein the reinforcing layer having improved durability.

19 Claims, 2 Drawing Sheets

(56) References Cited

FOREIGN PATENT DOCUMENTS

| | | |
|---|---|---|
| JP | 2008-012945 A | 1/2008 |
| JP | 2009-513436 A | 4/2009 |
| JP | 2009-528178 A | 8/2009 |
| JP | 2009-528925 A | 8/2009 |
| JP | 2010-036669 | 2/2010 |
| JP | 2010-036669 A | 2/2010 |
| WO | WO-2007/037541 A9 | 5/2007 |

OTHER PUBLICATIONS

Office action in counterpart Japanese Appln. No. 2010-2466362 dated Sep. 30, 2014.

Chinese Office Action dated May 4, 2014 issued in counterpart Chinese Application No. 201180006971.1.

* cited by examiner

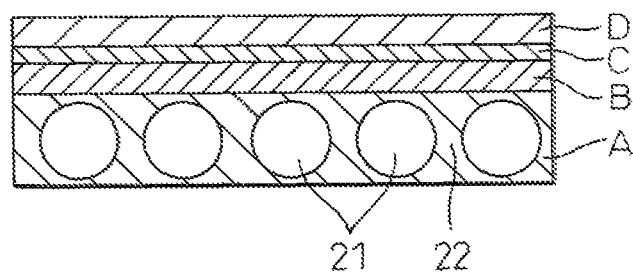

PNEUMATIC TIRE

CROSS REFERENCE TO RELATED APPLICATIONS

This application is a National Phase filing under 35 U.S.C. §371 of PCT/JP2011/064320 filed on Jun. 16, 2011; and this application claims priority to Application No. 2010-246362 filed in Japan on Nov. 2, 2010 under 35 U.S.C. §119; the entire contents of all are hereby incorporated by reference.

TECHNICAL FIELD

The present invention relates to a pneumatic tire using a film comprising a thermoplastic resin or a thermoplastic elastomer composition comprising a thermoplastic resin blended with an elastomer, and more particularly, it relates to a pneumatic tire capable of preventing a film from cracking and improving the appearance of the tire.

BACKGROUND ART

Recently, there have been many proposals for providing the inner surface of a pneumatic tire with a film comprising ethylene-vinyl alcohol copolymer (EVOH) known for its excellent gas barrier properties. For example, laminating an EVOH layer with a tie rubber layer and disposing them on the inner surface of a tire are proposed in Patent Documents 1 to 3. However, since there is a significant difference in stiffness between the coating rubber and the cords or wires, both of which comprise a reinforcing layer, the deformation of the reinforcing layer results in an uneven strain of low strain areas and high strain areas in the coating rubber of the reinforcing layer, corresponding to the arrangement of the reinforcing cords or wires in the planar direction of the reinforcing layer. Since EVOH has an elastic modulus which is significantly higher than those of the rubbers commonly used in pneumatic tires, EVOH is susceptible to the effects of the uneven strain resulted from the deformation of the reinforcing layer through the tie rubber layer and tends to result in breaking and cracking. Accordingly, in a pneumatic tire using a film comprising EVOH, the EVOH layer tends to result in cracking, and the cracks develop into the adjacent rubber layer, thereby reducing the appearance of the driven tire.

PRIOR ART DOCUMENTS

Patent Documents

Patent Document 1: Japanese Unexamined Patent Publication No. 2009-528925
Patent Document 2: Japanese Unexamined Patent Publication No. 2009-528178
Patent Document 3; Japanese Unexamined Patent Publication No. 2009-513436

SUMMARY OF THE INVENTION

Problems to be Solved by the Invention

An object of the present invention is to provide a pneumatic tire using a film comprising a thermoplastic resin or a thermoplastic elastomer composition comprising a thermoplastic resin blended with an elastomer, wherein cracking of the film is prevented and the appearance of the tire is improved.

Means to Solve the Problems

The inventors made studies with a view to solve the above problems, and as a result found that, by laminating a film layer having a specific stiffness on a reinforcing layer comprising a plurality of aligned reinforcing cords or wires that are coated with a coating rubber (a rubber composition), and laminating on this film an elastomer layer and a film layer comprising ethylene-vinyl alcohol copolymer, the uneven strain resulted from the reinforcing layer is uniformized or buffered with the intermediate layers (the film, layer and elastomer layer) and the generation of uneven and microscopically large strains is prevented or reduced, thereby capable of preventing or reducing the occurrences of breaking and cracking in the EVOH film, and consequently improves the appearance of the tire driven on the road.

According to the present invention, a pneumatic tire is provided, comprising (A) a reinforcing layer comprising a plurality of aligned reinforcing cords or wires that are coated with a rubber composition, wherein
(B) a film layer,
(C) an elastomer layer, and
(D) a film layer comprising ethylone-vinyl alcohol copolymer,
are sequentially laminated on the tire inner surface side of reinforcing layer (A), and the product of Young's modulus Eb (MPa) and thickness Gb (mm) of film layer (B) is equal to or more than 5 kN/m.

BRIEF DESCRIPTION OF THE DRAWINGS

FIG. 2 is a partial enlarged sectional view illustrating a reinforcing layer having laminated thereon film layer (B), elastomer layer (C), and film layer (D), in one embodiment of the pneumatic tire of the present invention.

MODE FOR CARRYING OUT THE INVENTION

Figure 1:
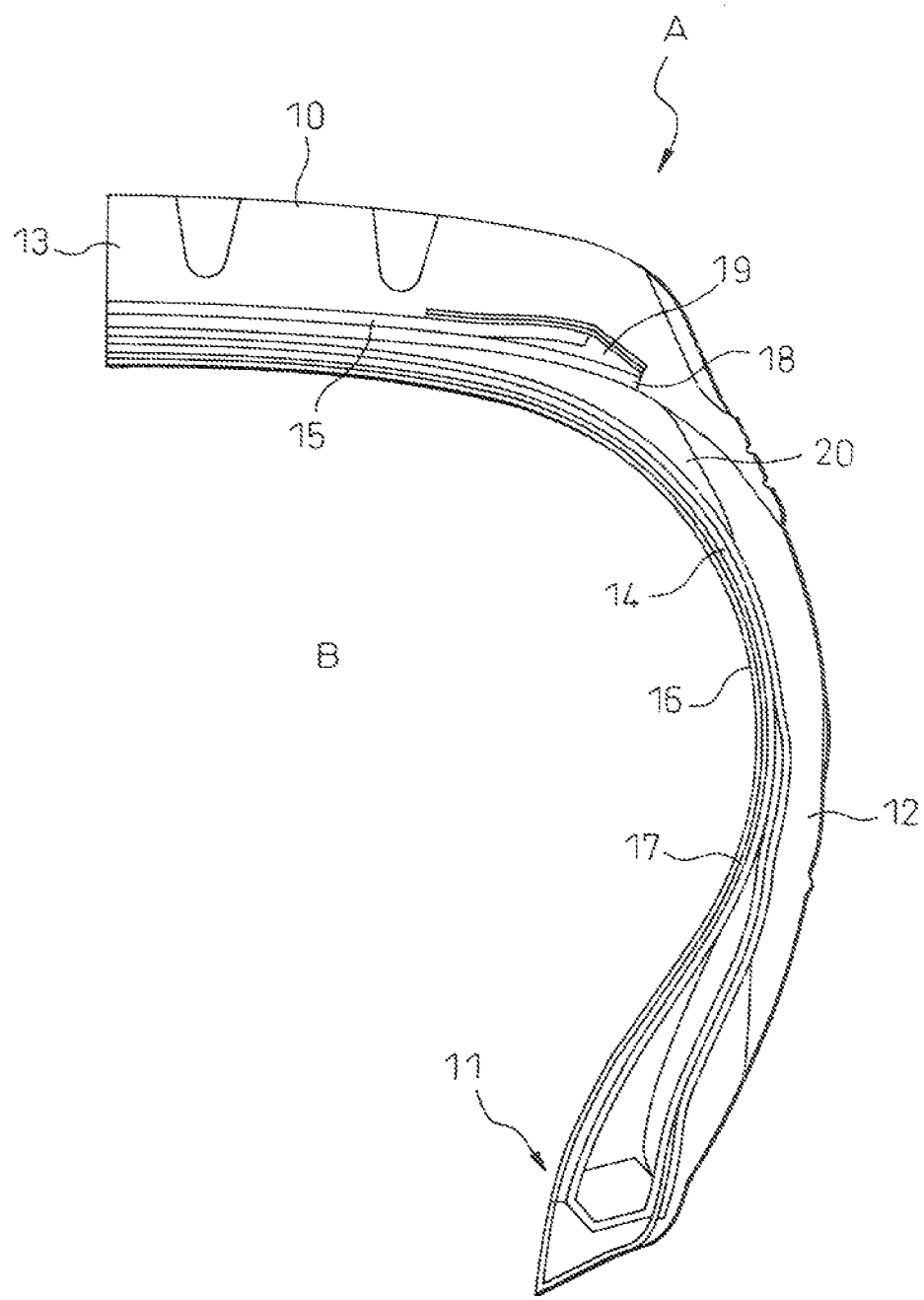
FIG. 1 is a partial sectional view illustrating a conventional pneumatic tire.

With reference to FIGS. 1 and 2, the construction of the present invention will foe explained in detail. FIG. 1 is a partial sectional view of a conventional pneumatic tire in the direction (the meridian direction) along the rotational axis direction. In FIG. 1, the pneumatic tire is comprised of a left-and-right pair of bead portions (11, 11), a left-and-right pair of sidewall portions (12, 12) connected to bead portions (11, 11), and a tread portion (13) disposed between sidewall portions (12, 12), as in conventional manner. Carcass layer (14) extends between the left-and-right pair of bead portions (11, 11), and in the tread portion (13), belt layer (15) is disposed so that it surrounds the outer circumference of the carcass layer. The tread surface is indicated with 10, an innerliner layer is indicated with 16, a tie rubber layer is indicated with 17, a belt edge portion is indicated with 13, and a L filler is indicated with 20.

The pneumatic tire according to the present invention has a construction in which film layer (B), elastomer layer (C), and film layer (D) comprising ethylene-vinyl alcohol copolymer are laminated on a reinforcing layer such as carcass layer, belt layer, belt covering layer, etc., as shown in FIG. 2. In FIG. 2, reinforcing cords or wires are indicated with 21, and a coating rubber (a rubber composition) is indicated with 22. Elastomer layer (C) may constitute a tie rubber layer. In addition, film layer (D) comprising ethylene-vinyl alcohol copolymer may constitute an innerliner layer.

Reinforcing layer (A) can be produced by a conventional method, and may have a conventional construction. The coating rubber (rubber composition) of reinforcing layer (A) is typically comprised of a diene rubber component selected from natural rubber and diene synthetic rubbers (for example, butadiene rubber (BR), styrene-butadiene copolymer rubber (SBR), polyisoprene rubber (IR), butyl rubber (IIR), acrylonitrile-butadiene copolymer rubber (NBR), chloroprene rubber (CR), ethylene-propylene-diene copolymer rubber (EPDM), styrene-isoprene copolymer rubber, chloroprene rubber (CR), styrene-isoprene-butadiene copolymer rubber (SIBR), isoprene-butadiene copolymer rubber, etc), reinforcing fillers such as carbon black and silica, and optional ingredients (for example, vulcanizing or crosslinking agents, vulcanizing or crosslinking accelerators, processing aids, various oils, antioxidants, other various types of ingredients usually blended in tire rubbers). The types of the materials of the reinforcing cords or wires are not particularly limited, and include, for example, metals such as steel, etc.; organic fibers such as nylon fibers, aramid fibers, polyester fibers, rayon fibers, acrylic fibers, etc.; inorganic fibers such as glass fibers, etc. Further, the reinforcing cords are preferably embedded in the coating rubber, for example, in the form of fabric, such as cord fabric, etc.

Film layer (B) laminated in adjacent to reinforcing layer (A) may be any film layer having the product of Young's modulus Eb (MPa) and thickness Gb (mm) of 5 kN/m or more. Film layer (B) preferably has a Young's modulus of 25 to 3000 (MPa), and more preferably 50 to 1500 (MPa). The Young's modulus is a value obtained by determining a stress-strain curve from a tensile test in accordance with JIS K6251, and calculating the initial slope of the curve. Film layer (B) preferably has a thickness of 0.01 to 1.0 mm, and more preferably 0.03 to 0.5 mm. If the product of Young's modulus Eb (MPa) and thickness Gb (mm) is less than 5 kN/m, it is difficult to uniformize or buffer the uneven strain resulted from reinforcing layer (A) with film layer (B). Film layer (E) may be a laminate of two or more layers. When film layer (B) is a laminate of two or more layers, it is possible to further buffer the strain by providing the laminate with a slope of Young's modulus in the stacking direction of the layers of film layer (B). When film layer (B) is a laminate of two or more layers, the Young's modulus of film layer (B) is equal to the Young's modulus of the laminate.

It is necessary that film layer (B) is a film having good durability, and film layer (B) is preferably comprised of a thermoplastic elastomer composition comprising a thermoplastic resin and an elastomer and having flexibility imparted by blending the elastomer to the thermoplastic resin. The thermoplastic resin which constitutes the thermoplastic elastomer composition can include, for example, polyolefin resins (for example, high density polyethylene (HOPE), low density polyethylene (LOPE), ultra-high molecular weight polyethylenes (UHMWPE), isotactic polypropylene, syndiotactic polypropylene, and ethylene-propylene copolymer resins); polyamide resins (for example, Nylon 6 (N6, Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6 (MXD6), Nylon 6T, Nylon 6/6T copolymer. Nylon 66/PP copolymer, and Nylon 66/PPS copolymer); polyester resins (for example, aromatic polyesters such as polybutylene terephthalate (PBT), polyethylene terephthalate (PET), etc.); polyether resins (for example, polyphenylene oxide (PPO), modified polyphenylene oxide (modified PPO), polysulfone (PSF), polyetheretherketone (PEEK)); polymethacrylate resins (for example, poly(methyl methacrylate) (PMMA), poly (ethyl methacrylate); polyvinyl resins (for example, ethylene-vinyl alcohol copolymer (EVOH), polyvinylidene chloride (PVDC), vinylidene chloride/methyl acrylate copolymer); fluororesins (for example, polyvinylidene fluoride (PVDF), polychlorofluoroethylene (PCTFE)), and polyacrylonitrile resin (PAN). One of these resins may foe used, or two or more of the resins may be used in combination.

Examples of the elastomer which constitutes the thermoplastic elastomer composition of film layer (B) can include diene rubbers and hydrogenation products thereof (for example, natural rubber (NR), isoprene rubber (IR), epoxidized natural rubber, styrene-butadiene rubber (SBR), butadiene rubber (BR) (high-cis BR and low-cis BR), nitrile rubber (NBR), hydrogenated NBR, hydrogenated SBR), olefin rubbers (for example, ethylene-propylene rubber (EPDM, EPM), maleic acid-modified ethylene-propylene rubber (M-EPM), maleic acid-modified ethylene-taut ene copolymer (M-EB), butyl rubber (IIP), copolymers of isobutylene and an aromatic vinyl or diene monomer), acrylic rubbers (ACM), halogen-containing rubbers (for example, bromobutyl rubber (Br-IIR), chlorobutyl rubber (Cl-IIR), brominated isobatylene-pararnethylstyrene copolymer (Br-IPMS), chloroprene rubber (CR), hydrin rubber (CHR.CRC); chlorosulfonated polyethylene (GSM), chlorinated polyethylene (CM), maleic acid-modified chlorinated polyethylene (M-CM)), silicone rubbers (for example, methylvinylsilicone rubber, dimethylsilicone rubber, methylphenylvinylsilicone rubber), sulfur-containing rubbers (for example, polysulfide rubber), fluororubbers (for example, vinylidene fluoride rubbers, fluorine-containing vinylether rubbers, tetrafluoroethylene-propylene rubbers, fluorine-containing silicone rubbers, fluorine-containing phosphazene rubbers), thermoplastic elastomers (for example, styrene elastomers, olefin elastomers, and polyamide elastomers), and the like. One of these elastomers, or two or more of these elastomers may be used in combination. In film layer (B), the amount of the elastomer component is typically 10 to 90 parts for weight, preferably 15 to 80 parts by weight, with respect to 100 parts by weight of the thermoplastic resin. It the amount of the elastomer component is less than 10 parts by weight with respect to 100 parts by weight of resin (D), the film, layer has insufficient flexibility, and if the amount of the elastomer component, is more than 90 parts by weight with respect to 100 parts by weight of resin (D), the film layer is too flexible, and therefore it is not able to prevent localized strain from occurring around the reinforcing layer.

The thermoplastic elastomer composition which constitutes film layer (B) can be prepared by crosslinking a crosslinkable elastomer component while melt-kneading it with a thermoplastic resin in the presence of a crosslinking agent and optional additives. Such a process is known as dynamic crosslinking. By dynamic crosslinking, a thermoplastic resin and a crosslinkable elastomer component are melt-kneaded along with a crosslinking agent at or above the temperature at which the crosslinking by the crosslinking agent occurs, and therefore it is possible to crosslink the crosslink-able elastomer and to finely disperse the crosslinkable elastomer component in the thermoplastic resin. The thermoplastic elastomer composition produced by such a process can be molded as with usual thermoplastic resins, since the crosslinked elastomer particles derived from the crosslinkable elastomer component are finely dispersed in the thermoplastic resin which constitutes a continuous phase. The preparation of the thermoplastic elastomer composition can be carried out by using a well-known kneading machine such as kneader, Banbury mixer, single-screw kneading extruder, twin-screw kneading extruder, etc., and the preparation of the thermoplastic elastomer composition is preferably carried out using a twin-screw kneading extruder, in view of its high productivity. A person with ordinary skill in the art can appropriately select the dynamic crosslinking conditions depending on the types and amounts of the thermoplastic resin and the elastomer component.

A person with ordinary skill in the art can appropriately select the type and amount of the crosslinking agent (or vulcanizing agent) which can be used in the preparation of the thermoplastic elastomer composition which constitutes film layer (B) depending on the type of the crosslinkable elastomer component and the dynamic crosslinking conditions. Examples of the crosslinking agent include zinc oxide, stearic acid, zinc stearate, sulfur, organic peroxide crosslinking agents, 3,3-diaminodiphenylsulfone, etc.

In addition, when the above specific thermoplastic resin has a different chemical compatibility from that of the crosslinkable elastomer component, a compatibilizer is preferably added so that they are compatibilized with each other. The interfacial tension between the thermoplastic resin and the elastomer component is lowered by the addition of a compatibilizer, and consequently the particle diameter of the elastomer component which forms a disperse phase become fine, and as a result, the characteristic properties of these compositions are more effectively developed. The compatibilizer generally includes a copolymer having both or either of the resin component and elastomer component, or those having a structure of a copolymer having epoxy group, carboxyl group, carbonyl group, halogen group, amino group, oxazoline group, hydroxy group, etc., capable of reacting with the resin component or elastomer component. The compatibilizer can be selected depending on the types of the resin and elastomer components to be mixed. General-purpose compatibilizers include styrene-ethylene-butylene-styrene block copolymers (SEBS) and maleic acid-modified products thereof, EPDM, EPM and maleic acid-modified products thereof, EPDM/styrene or EPDM/acrylonitrile graft copolymers and maleic acid-modified products thereof, styrene/maleic acid copolymer, reactive, fenoxin, etc. When a compatibilizer is blended with the thermoplastic elastomer composition, there is no specific limitation in the amount of the compatibilizer, and the amount of the compatibilizer is typically such an amount that the proportion of the compatibilizer is 0.5 to 20 parts by weight with respect to 100 parts by weight of the polymer component (total amount of the thermoplastic resin and elastomer composition).

In the preparation of the thermoplastic elastomer composition which constitutes film layer (B), any additives such as compatibilizers, reinforcing agents, antioxidants, vulcanization accelerators, vulcanization accelerator activators, plasticizers, fillers, coloring agents, processing aids, etc., may optionally foe used in conventional amounts, insofar as the object of the present invention is not diminished. Although the additives for the elastomer component may be added during the kneading described above, the additives for the elastomer component, other than vulcanizing agents, are preferably premixed prior to the kneading step described above. The additives for the resin component may be prefixed prior to the kneading step described above, or may be added during the kneading step described above.

The thermoplastic resin composition that has been melt-kneaded as described above can be extruded in a molten state from a die attached to the outlet port of the twin-screw kneading extruder using a common method into the form of film, or may be extruded into the form of strand and pelletized with a resin pelletizer, and subsequently the resulting pellets are formed into the form of film using a common resin forming method such as inflation forming, calendar forming, extrusion forming, etc.

Elastomer layer (C) which is laminated above film layer (B) is preferably comprised of diene rubber and hydrogenation products thereof (for example, natural rubber, polyisoprene rubber, epoxidized natural rubber, styrene-butadiene copolymer rubber, polybutadiene rubber (high-cis BR and low-cis BR), NBR, hydrogenated NBR, hydrogenated SBR), various elastomers, for example, olefin rubbers (for example, ethylene-propylene rubber (EPRM, EPM), maleic acid-modified ethylene-propylene rubber (M-EPM), IIR, copolymers of isobutylene and an aromatic vinyl or diene monomer), halogen-containing rubbers (for example, bromobutyl rubber, chlorobutyl rubber, brominated isobutylene-paramethylstyrene copolymer (Br-IPMS), chlorosulfonated polyethylene (GSM), chlorinated polyethylene (CM), maleic acid-modified chlorinated polyethylene (M-CM), thermoplastic elastomers (for example, styrene elastomers, olefin elastomers, ester elastomers), and the like, a reinforcing agent such as carbon and silica, etc. Elastomer layer (C) preferably has a thickness of 0.01 to 3.0 mm, more preferably 0.01 to 2.0 mm. If elastomer layer (C) is too thin, it is not able to uniformize or buffer the uneven strain resulted from reinforcing layer (A), and if elastomer layer (C) is too thick, for example, in case of bending deformation, the elastomer layer bends about reinforcing cords that act as fulcrum, and the strain resulted from reinforcing layer (A) increases proportionally to the distance (bending radius) from a reinforcing cord, and therefore elastomer layer (C) which is too thin or too thick is not preferred.

Film layer (D) which is laminated above elastomer layer (C) comprises ethylene-vinyl alcohol copolymer (EVOH). The EVOH which can be used in film layer (D) can be prepared by a well known method, for example, by polymerizing ethylene with vinyl acetate to produce ethylene-vinyl acetate copolymer (EVA), and hydrolyzing the resulting EVA. Examples of commercially available EVOHs that can be used in the present invention include, for example, EVALs manufactured by Kuraray Co., Ltd. and Soarnols manufactured by The Nippon Synthetic Chemical Industries Co. Ltd. A single EVOH may be used, or two or more EVOHs may be used in combination. Film layer (D) is not limited to these, provided that it comprises EVOH. However, if the above structure is applied when film layer (D) comprises 3 parts by weight or more of EVOH with respect to 100 parts by weight of the thermoplastic resin, the durability of the EVOH film is improved, and if the above structure is applied when film layer (D) comprises 50 parts by weight or more of EVOH with respect to 100 parts by weight of the thermoplastic resin, the effect of improving the durability is significantly high. Film layer (D) may be a laminate of 2 or more EVOH-containing layers. Preferably, film layers (B) and (D) are configured so that film layer (B) has a Young's modulus Eb which is 5% or more and up to 80% of the Young's modulus Ed of film layer (D), and more preferably, film layers (B) and (D) are configured so that film layer (B) has a Young's modulus Eb which is 5% or more and up to 70% of the Young's modulus Ed of film layer (D). If the Young's modulus of film layer (B) is too high, film, layer (B) is prone to easily break by being subjected to the uneven strain resulted from reinforcing layer (A), and if the Young's modulus of film layer (B) is too low, film layer (B) cannot uniformize or buffer the uneven strain resulted from reinforcing layer (A). Film layer (D) preferably has a thickness of 0.001 to 1.0 mm, and more preferably 0.001 to 0.5 mm. If film layer (C) is too thick, the stiffness of film layer (D) is too high, and it is difficult to use film layer (D) as a tire member.

If desired, an adhesive may be applied between reinforcing layer (A) and film layer (B) to improve the adhesion between reinforcing layer (A) and film layer (B). An adhesive may be applied between film layer (B) and elastomer layer (C), and/ or between elastomer layer (C) and film layer (D), to improve the adhesion between film layer (B) and elastomer layer (C), and/or between elastomer layer (C) and film layer (D). Specific examples of the adhesive polymers which may constitute the adhesive layer include ultra-high molecular weight polyethylenes (UHMWPE) having a molecular weight of 1,000,000 or more, preferably 3,000,000 or more, acrylate copolymers such as ethylene-ethyl acrylate copolymers (EEA), ethylene-methyl acrylate resins (EMA), ethylene-acrylic acid copolymers (EAA), etc., and anhydrous maleic acid-adducts thereof, polypropylenes (PP) and maleic acid-modified products thereof, ethylene-propylene copolymer and maleic acid-modified products thereof, polybutadiene resins and anhydrous maleic acid-modified products thereof, styrene-butadiene-styrene copolymers (SBS), styrene-ethylene-butadiene-styrene copolymers (SEBS), fluorothermoplastic resins, polyester thermoplastic resins, etc. These polymers may be formed into a sheet or film form, for example, by extruding with a resin extruder, in accordance with a conventional method. Although the thickness of the adhesive layer is not particularly limited, the thickness is preferably from 5 μm to 150 μm.

In addition, an elastomer layer may be provided between reinforcing layer (A) and film layer (B), if desired. The provision of an elastomer layer between reinforcing layer (A) and film layer (B) can reduce the uneven localized strain between reinforcing layer (A) and film layer (B). Moreover, an elastomer layer, for example, a tie rubber layer, may be provided above film layer (D). The provision of an elastomer layer above film layer (D) can protect the thin film layer from scratching. The elastomer layer which can be provided between reinforcing layer (A) and film layer (B), and the elastomer layer which can be provided above film layer (D) can be configured from the same elastomer materials as described above for film layer (C). Although there is no particular limitation in the thickness of the elastomer layer which can be provided between reinforcing layer (A) and film layer (B), the thickness is preferably from 0.1 mm to 1.5 mm. Although there is no particular limitation in the thickness of film layer (D) provided above film layer (D), the thickness is preferably from 0.1 mm to 1.5 mm. In addition, an adhesive as described above may be applied between the elastomer layer provided between reinforcing layer (A) and film layer (B) and film layer (B), and/or between film layer (D) and the elastomer layer provided on film layer (D), to improve the adhesion between the elastomer layer provided between reinforcing layer (A) and film layer (B) and film layer (B), and/or the adhesion between film layer (D) and the elastomer layer provided on film layer (D).

In the present invention, film layer (B), elastomer-layer (G) and film layer (D) may be provided across the entire surface of one side or the entire surfaces of both sides of reinforcing layer (A), or may foe provided on a part of one side or both sides of reinforcing layer (A), for example, the shoulder regions on both sides of the carcass layer in the tire-width direction. It is advantageous to provide film layer (B), elastomer layer (C) and film layer (D) on the parts that particularly affect tire durability, for example, the shoulder regions (for example, around belt edge portions, around belt edge cushions, around L filler, etc.) on both sides in the tire-width direction.

EXAMPLES

The present invention will be further explained with reference to the following examples, and it should be understood that the scope of the present invention is not limited by these examples.

Preparation of Film Layer (B)

A thermoplastic resin (Nylon), an elastomer (rubber component), and crosslinking-system ingredients needed to carry out dynamic crosslinking, in the formulation proportions (parts by weight) shown in Table 1 below, were mixed in a twin-screw kneading extruder at a temperature of 230° C. to finely disperse the elastomer in the thermoplastic resin which forms a continuous phase, and the resulting mixture was extruded from the outlet port of the twin-screw kneading extruder into a strand form, and the resulting strand was cut into pellets with a cutter to obtain, the pellets of a thermoplastic elastomer composition.

Then, the pellets of the thermoplastic compositions prepared as described above were inflation molded at a temperature of 230° C. using a common inflation molding apparatus to obtain film layers (B) having a Young's modulus of 110 MPa of Example 4 and Comparative Example 2 as well as film layer (B) having a Young's modulus of 1760 MPa of Example 5. Film layers (B) of Examples 1 to 3 and 6 were prepared with varying the amounts of Nylon 11, Nylon 6, Nylon 6.66, and Br-IPMS other than zinc oxide, stearic acid, and zinc stearate, in Table 1 below.

TABLE 1

Formulation of Film Layer (B)

| | Amounts (parts by weight) | |
| --- | --- | --- |
| Ingredients | Example 4 and Comparative Example 2 | Example 5 |
| Nylon 11[1] | 18.0 | 42.0 |
| Nylon 6,66[2] | 12.0 | 28.0 |
| Br-IPMS[3] | 70.0 | 30.0 |
| Zinc oxide[4] | 0.3 | 0.3 |
| Stearic acid[5] | 1.2 | 1.2 |
| Zinc stearate[6] | 0.6 | 0.6 |

Footnote:
[1]BESN O TL from Arkema
[2]5033B from Ube Industries, Ltd.
[3]Exxpro MDX89-4 from ExxonMobile Chemical Company
[4]Zinc oxide of JIS grade 3 from Seido Chemical Industry Co., Ltd.
[5]Beads Stearic Acid from Nippon Oil & Fat Co., Ltd.
[6]Zinc stearate from Seido Chemical Industry Co., Ltd.

Preparation of Elastomer Layer (C)

Next, ingredients other than the vulcanizing agents in the formulation shown in Table 2 below were kneaded at a temperature of 70° C. for 5 minutes in a 1.7 liter Banbury mixer to obtain a masterbatch, and subsequently the resulting masterbatch was kneaded with vulcanizing agents on an 8 inch roller to obtain elastomer layers (C) having various thicknesses.

TABLE 2

Formulation of Elastomer Layer (C)

| Ingredients | Amounts (parts by weight) |
| --- | --- |
| SBR[1] | 50 |
| Natural rubber[2] | 50 |
| Carbon black[3] | 60 |
| Stearic acid[4] | 1 |
| Aromatic oil[5] | 7 |
| Zinc stearate[6] | 3 |
| Sulfur[7] | 3 |
| Vulcanization accelerator[8] | 1 |

Footnote:
[1]Nipol 1502 from Zeon Corporation
[2]SIR-20
[3]Seast V from Tokai Carbon Co., Ltd.
[4]Industrial grade stearic acid from Nippon Oil & Fat Co., Ltd.
[5]Desorex No. 3 from Showa Shell Petroleum Co., Ltd.
[6]Zinc oxide of JIS grade 3 from Seido Chemical Industry Co., Ltd.
[7]5% Oil-treated sulfur from Hosoi Chemical Industry Co., Ltd.
[8]Nocceler DM from Ouchi Shinko Chemical Industrial Co., Ltd.

Preparation of Film Layer (D)

Thermoplastic resins (Nylon and EVOH), an elastomer (rubber component), and a crosslinking-system ingredient needed to carry out dynamic crosslinking, in the formulation proportions (parts by weight) shown in Table 3 below were mixed in a twin-screw kneading extruder at a temperature of 230° C. as with film layer (B), and the resulting mixture was extruded into a strand form, and the strand was cut into pellets to prepare the pellets of a thermoplastic elastomer composition, and then the resulting pellets were inflation-molded to obtain film layer (D).

TABLE 3

Formulation of Film Layer (D)

| Ingredients | Amounts (parts by weight) |
| --- | --- |
| Nylon[1] | 40.0 |
| EVOH[2] | 60.0 |
| Modified rubber[3] | 77.2 |
| Crosslinking agent[4] | 0.8 |

Footnote:
[1]UBE Nylon 1022B from Ube Industries, Ltd.
[2]Soarnol H4412B from The Nippon Synthetic Chemical Industries Co., Ltd.
[3]Tafmer MH-7020 from Sumitomo Chemical Co., Ltd.
[4]3,3'-DAS (3,3'-diaminodiphenylsulfone) from Mitsui Fine Chemical Inc.

Tire Manufacture

In a pneumatic tire (tire size: 215/70 R 15) comprising a combination of a carcass, a tie rubber, an adhesive layer and an air permeation preventing layer, a laminate of film layer (B), elastomer layer (C), and film layer (C), was disposed as the air permeation preventing layer to manufacture the tires of Examples 1 to 6 and Comparative Examples 1 to 2.

The tire of Comparative Example 1 had a film layer comprising ethylene-vinyl alcohol copolymer and having a Young's modulus of 2200 MPa and a thickness of 0.03 mm as an air permeation preventing layer on the tire inner surface.

Example 1 had the same structure as that of Comparative Example 1, except that a film layer comprising a thermoplastic elastomer composition and having a Young's modulus of 270 MPa and a thickness of 0.1 mm, an elastomer layer having a thickness of 0.5 mm, and a film layer comprising ethylene-vinyl alcohol copolymer and having a Young's modulus of 2200 MPa and a thickness of 0.03 mm were laminated in this order from the carcass layer side as air permeation preventing layers.

Example 2 had the same structure as that of Comparative Example 1, except that a film layer comprising a thermoplastic elastomer composition and having a Young's modulus of 270 MPa and a thickness of 0.1 mm, an elastomer layer having a thickness of 0.01 mm, and a film layer comprising ethylene-vinyl alcohol copolymer and having a Young's modulus of 2200 MPa and a thickness of 0.03 mm were laminated in this order from the carcass layer side as air permeation preventing layers.

Example 3 had the same structure as that of Comparative Example 1, except that a film layer comprising a thermoplastic elastomer composition and having a Young's modulus of 270 MPa and a thickness of 0.1 mm, an elastomer layer having a thickness of 3.0 mm and a film layer comprising ethylene-vinyl alcohol copolymer and having a Young's modulus of 2200 MPa and a thickness of 0.03 mm were laminated in this order from the carcass layer side as air permeation preventing layers.

Example 4 had the same structure as that of Comparative Example 1, except that a film layer comprising a thermoplastic elastomer composition and having a Young's modulus of 110 MPa and a thickness of 0.2 mm, an elastomer layer having a thickness of 0.5 mm, and a film layer comprising ethylene-vinyl alcohol copolymer and having a Young's modulus of 2200 MPa and a thickness of 0.03 mm were laminated, in this order from, the carcass layer side as air permeation preventing layers.

Example 5 had the same structure as that of Comparative Example 1, except that a film layer comprising a thermoplastic elastomer composition and having a Young's modulus of 1760 MPa and a thickness of 0.01 mm, an elastomer layer having a thickness of 0.5 mm, and a film layer comprising ethylene-vinyl alcohol copolymer and having a Young's modulus of 2200 MPa and a thickness of 0.03 mm were laminated in this order from the carcass layer side as air permeation preventing layers.

Comparative Example 2 had the same structure as that of Comparative Example 1, except that a film layer comprising a thermoplastic elastomer composition and having a Young's modulus of 110 MPa and a thickness of 0.02 mm, an elastomer layer having a thickness of 0.5 mm, and a film layer comprising ethylene-vinyl alcohol copolymer and having a Young's modulus of 2200 MPa and a thickness of 0.03 mm were laminated in this order from the carcass layer side as air permeation preventing layers.

Example 6 had the same structure as that of Comparative Example 1, except that a film layer comprising a thermoplastic elastomer composition and having a Young's modulus of 270 MPa and a thickness of 0.02 mm, an elastomer layer having a thickness of 0.5 mm, and a film layer comprising ethylene-vinyl alcohol copolymer and having a Young's modulus of 2200 MPa and a thickness of 0.03 mm were laminated in this order from the carcass layer side as air permeation preventing layers.

In each of the film layers comprising ethylene-vinyl alcohol (EVOH), ethylene-vinyl alcohol copolymer constitutes 60 parts by weight among 100 parts by weight of the thermoplastic resin.

JIS dumbbell No. 3 specimen was prepared from each of the above film layer corresponding to film layer (B) or film layer (D), and a stress-strain curve was obtained from the tensile test in accordance with JIS KS6251, and the Young's modulus was calculated from the initial slope of the curve.

Test Method

Durability: Each test tire was mounted to a rim having a rim size of 15×61/2J J, and was driven for 50,000 km on a drum having a diameter of 1700 mm at a speed of 80 km/h under the conditions of an air pressure of 200 kPa, a room temperature of 38° C., and a load of 6.0 kN, and subsequently the inner surface of the test tire was visually observed for the occurrence of cracks. The test results were represented by "no crack" where cracks were not observed, or "cracks" where one or more cracks were observed. The results will be shown in Table 4.

TABLE 4

| | Test Results | | | | | | | |
|---|---|---|---|---|---|---|---|---|
| | Comp. Example 1 | Example 1 | Example 2 | Example 3 | Example 4 | Example 5 | Comp. Example 2 | Example 6 |
| Thickness Gb (mm) of film layer B | — | 0.1 | 0.1 | 0.1 | 0.2 | 0.01 | 0.02 | 0.02 |
| Thickness Gc (mm) of elastomer layer C | — | 0.5 | 0.01 | 3.0 | 0.5 | 0.5 | 0.5 | 0.5 |
| Young's modulus Eb (MPa) of film layer B | — | 270 | 270 | 270 | 110 | 1760 | 110 | 270 |
| Product Eb × Gb (kN/m) | — | 27 | 27 | 27 | 22 | 17.6 | 2 | 5.4 |
| Young's modulus Ed (MPa) of film layer D | 2200 | 2200 | 2200 | 2200 | 2200 | 2200 | 2200 | 2200 |
| 100 × Eb/Ed (%) | — | 12% | 12% | 12% | 5% | 80% | 5% | 12% |
| Durability | Cracks | No crack | No crack | No crack | No crack | No crack | Cracks | No crack |

Table 4 shows that, when film layer (S), elastomer layer (C), and EVOH containing film layer (D) are laminated on a reinforcing layer in accordance with the present invention, film layer (D) can be prevented from breaking, thereby improving the durability of film (D). In the case of Comparative Example 1 in which an EVOH-containing film layer was laminated without the intervention of film layer (B) and elastomer layer (C), cracks were occurred, and therefore Comparative Example 1 had poor appearance as compared to Examples 1 to 6. In the case of Comparative Example 2, since film layer (B) had too low a stiffness, cracks occurred in the EVOH layer, and therefore Comparative Example 2 had poor appearance as compared to Examples 1 to 6.

EXPLANATION OF SYMBOLS

10 Tread surface
11 Bead portion
12 Sidewall portion
13 Tread portion
14 Carcass layer
15 Belt layer
16 Innerliner layer
17 Tie rubber
18 Belt edge portion.
19 Belt edge cushion
20 L filler

The invention claimed is:

1. A pneumatic tire comprising (A) a reinforcing layer comprising a plurality of aligned reinforcing cords or wires that are coated with a rubber composition, wherein
   (B) a film layer,
   (C) an elastomer layer, and
   (D) a film layer comprising ethylene-vinyl alcohol copolymer,
   are sequentially laminated on the tire inner surface side of reinforcing layer (A), and the product of Young's modulus Eb (MPa) and thickness Gb (mm) of film layer (B) is equal to or more than 5 kN/m, and
   wherein the film layer (D) is exposed to the tire cavity.

2. The pneumatic tire according to claim 1, wherein film layer (B) comprises a thermoplastic elastomer composition comprising a thermoplastic resin and an elastomer.

3. The pneumatic tire according to claim 2, wherein the Young's modulus Eb of film layer (B) is equal to or more than 5% and is equal to or less than 80% of the Young's modulus Ed of film layer (D).

4. The pneumatic tire of claim 3, wherein elastomer layer (C) has a thickness of from 0.01 to 3.0 mm.

5. The pneumatic tire of claim 4, wherein reinforcing layer (A) is a carcass layer.

6. The pneumatic tire of claim 3, wherein reinforcing layer (A) is a carcass layer.

7. The pneumatic tire of claim 2, wherein elastomer layer (C) has a thickness of from 0.01 to 3.0 mm.

8. The pneumatic tire of claim 7, wherein reinforcing layer (A) is a carcass layer.

9. The pneumatic tire of claim 2, wherein reinforcing layer (A) is a carcass layer.

10. The pneumatic tire according to claim 1, wherein the Young's modulus Eb of film layer (B) is equal to or more than 5% and is equal to or less than 80% of the Young's modulus Ed of film layer (D).

11. The pneumatic tire of claim 10, wherein elastomer layer (C) has a thickness of from 0.01 to 3.0 mm.

12. The pneumatic tire of claim 11, wherein reinforcing layer (A) is a carcass layer.

13. The pneumatic tire of claim 10, wherein reinforcing layer (A) is a carcass layer.

14. The pneumatic tire of claim 1, wherein elastomer layer (C) has a thickness of from 0.01 to 3.0 mm.

15. The pneumatic tire of claim 14, wherein reinforcing layer (A) is a carcass layer.

16. The pneumatic tire of claim 1, wherein reinforcing layer (A) is a carcass layer.

17. The pneumatic tire of claim 16, wherein reinforcing layer (A) is a carcass layer.

18. A pneumatic tire comprising (A) a reinforcing layer comprising a plurality of aligned reinforcing cords or wires that are coated with a rubber composition, wherein
   (B) a film layer,
   (C) an elastomer layer, and
   (D) a film layer comprising ethylene-vinyl alcohol copolymer,
   are sequentially laminated on the tire inner surface side of reinforcing layer (A), and the product of Young's modulus Eb (MPa) and thickness Gb (mm) of film layer (B) is equal to or more than 5 kN/z, and
   wherein the film layer (B) and reinforcing layer (A) are in contact at each and every point of the outermost surface of film layer B.

19. A pneumatic tire comprising (A) a reinforcing layer comprising a plurality of aligned reinforcing cords or wires that are coated with a rubber composition, wherein (B) a film layer,
(C) an elastomer layer, and
(D) a film layer comprising ethylene-vinyl alcohol copolymer, are sequentially laminated on the tire inner surface side of reinforcing layer (A), and the product of Young's modulus Eb (MPa) and thickness Gb (mm) of film layer (B) is equal to or more than 5 kN/z, and wherein the film layer (B), elastomer layer (C) and film layer (D) are provided across the entire surface of one side of reinforcing layer (A).

* * * * *